United States Patent [19]

Jahn

[11] 4,257,811
[45] Mar. 24, 1981

[54] SOLARIZATION AND IRRADIATION RESISTANT OPTICAL GLASSES

[75] Inventor: Walter Jahn, Ingelheim, Fed. Rep. of Germany

[73] Assignee: JENAer Glaswerk Schott & Gen., Mainz, Fed. Rep. of Germany

[21] Appl. No.: 59,594

[22] Filed: Jul. 23, 1979

[30] Foreign Application Priority Data

Jul. 21, 1978 [DE] Fed. Rep. of Germany ....... 2832066

[51] Int. Cl.$^3$ .............................................. C03C 3/10
[52] U.S. Cl. .................................. 106/47 Q; 106/52; 106/54
[58] Field of Search ......................... 106/47 Q, 52, 54

[56] References Cited

U.S. PATENT DOCUMENTS

| | | | |
|---|---|---|---|
| 3,671,277 | 6/1972 | Ohno et al. | 106/47 Q |
| 3,969,121 | 7/1976 | Atkinson | 106/52 |
| 4,036,623 | 7/1977 | Deeg et al. | 106/47 Q |

FOREIGN PATENT DOCUMENTS 1771312  1/1973  Fed. Rep. of Germany ........ 106/47 Q Primary Examiner—O. R. Vertiz
Assistant Examiner—Mark Bell
Attorney, Agent, or Firm—Haight, Rosfeld, Noble & Santa Maria

[57] ABSTRACT

Optical glass is disclosed which has an increased resistance to solarization and irradiation as well as little or no undesirable coloring. This glass is designed to exhibit as many properties having optimal values as possible. The silicate glass used is free of alkaline earth metal oxides and incorporates $CeO_2$ and both zinc and strontium ions in very small concentrations. The latter two materials further improve the solarization and irradiation resistance properties of the glass. Furthermore, as the zinc and strontium ions are effective when used in low concentrations, they serve to minimize any undesirable glass coloring.

1 Claim, No Drawings

SOLARIZATION AND IRRADIATION RESISTANT OPTICAL GLASSES

TECHNICAL FIELD OF THE INVENTION

This invention relates generally to optical glasses and more particularly to optical glasses which have an increased resistance to solarization and irradiation and have little or no coloring.

BACKGROUND ART

In the interest of economy, it is desirable to limit the number of optical glasses to be produced by a manufacturer. Accordingly, it is desirable to utilize glass compositions which have as many different areas of applicability as possible and which therefore must exhibit a multitude of properties in optimum proportions among themselves. Under ideal circumstances, with respect to a specific position in the $n_d/v_d$ diagram having a "normal" relative particle dispersion (positioned on or near the Abbe line), such glasses possess as many properties having optimal values as is possible. Examples of these properties include good melting properties, crystallization stability, high light transmission, chemical resistance toward the greatest number of influences, low negative interaction with irradiation, easy workability and freedom from hazardous compounds.

Some of these properties lend themselves to being maintained at optimal values in combination, whereas others are difficult to maintain or can be maintained only by using certain special elements. Modern processing and cleaning of the starting materials for glasses, for instance, have the effect of increasingly lowering the solarization resistance of optical glasses made therefrom. It is known that solarization and other irradiation resistance can be increased by introducing small amounts of $CeO_2$ into the glasses. However, this usually causes considerable deterioration of the transmission curve as a result of a shift of the absorption edge towards longer wavelengths in the UV-range, with the ends of this absorption edge clearly reaching into the range of visible light. Such a result severely limits the applicability of such glasses for optical purposes.

DISCLOSURE OF THE INVENTION

Accordingly, it is a general object of the present invention to provide new and improved optical glasses which have a combination of as many properties having optimal values as is practically possible.

Another object of the present invention is to provide new and improved optical glasses which have little or no undesirable coloration.

A further object of the present invention is to provide new and improved optical glasses which are resistant to solarization and other undesirable irradiation.

Upon further study of the specification and appended claims, additional objects, features and advantages of the present invention will become more fully apparent to those skilled in the art to which this invention pertains.

BEST MODE FOR CARRYING OUT THE INVENTION

Briefly, the above and other objects, features and advantages of the present invention are attained in one aspect thereof by providing optical glasses having the following composition in percent by weight:

$SiO_2$: 68–75 percent
$Al_2O_3$: 4.5–8 percent
$B_2O_3$: 0–4 percent
$Na_2O$: 16–22 percent
$CeO_2$: 0.5–2.8 percent
$ZnO$: 0.05–0.8 percent
$SrO$: 0.05–0.8 percent.

According to the present invention, the disadvantage of undesirably deteriorated inherent glass coloring can be eliminated by using basic glasses having a composition which is modified relative to the cerium oxide additive in such a manner that such troublesome color is avoided. It has been found that silicate glasses substantially free of alkaline earth metal oxides, and having a high $SiO_2$-content, relatively high $Al_2O_3$ and $Na_2O$ contents and $CeO_2$ additives create no or nearly no absorption in the range of visible light. This unexpected finding additionally provided the impetus for tests designed to improve the solarization and other irradiation resistance properties of the glasses. It was further unexpectedly found that this result can be achieved by the addition of both zinc and strontium ions in very small concentrations. The resultant glasses are solarization resistant, resistant to other ionizing irradiation (e.g., X-rays, particulate radiation) and simultaneously either free of coloring or having only a little coloring.

The $B_2O_3$ content in the given concentrations of up to 4 percent by weight has only a minor influence on the inherent coloring and discoloration of the glasses during irradiation while it simultaneously enhances the melting properties of the glasses.

The limits for the allowable amounts of various materials within the composition of the glasses of the present invention are relatively narrow. As soon as they are exceeded, the inherent coloring or discoloration of the glasses under the effect of irradiation exhibits a disproportionately rapid increase.

The glasses of the present invention fall within the range of crown glasses in the narrow sense of the definition of such glasses ($n_d = 1.49-1.54$; $v_d = 55-22$), as they have optical values of $n_d$ about 1.50 and $v_d$ about 58. Furthermore, the glasses of the present invention are characterized by the following properties: good light transmission, density about 2.46 g/cm$^3$, low susceptibility to crystallization, good chemical stability (class 1 climate change stability, class 2 acid stability, class 0 spot value), very minor formation of color centers during irradiation, very high electrical conductivity of about $10^{-10} \times cm^{-1}$, thermal expansion coefficients from $-30$ to $+70°$ C. of about $88 \times 10^{-7}°$ C. and good workability.

The glasses of the present invention are basically composed of a stable, highly cross-linked glass framework ($SiO_2$, $Al_2O_3$), a monovalent cross-linkage change agent with a relatively small ion radius ($Na_2O$) and an effective amount of stabilizers to prevent the formation of color centers comprising at least one member selected from the group consisting of $CeO_2$, $ZnO$ and $SrO$. Resistance against solarization and discoloration during irradiation will fully develop due to the diaphanous cross-linkage structure and the resultant easy mobility of the sodium ions. The incorporation of larger quantities of bridging cations (e.g., alkaline earth metal ions) would considerably interfere with the development of the desired resistance and result in inherent color or induced discoloration. Facilitating high sodium ion mobility creates conditions for a rapid recombination of radiation-induced absorption centers and other discoloration resulting from irradiation such as solarization. The control of ion mobility also reduces, to a considerable degree, the development of electrostatic charges. The effect of using cerium in the glass in order to prevent discoloration during irradiation has been known. However, its effectiveness depends to a great degree upon the basic composition of the glasses used and in many glass compositions this effect is moderate or even very low with the resultant inherent color being more or less marked.

In contradistinction to such prior art attempts, glasses made in accordance with the present invention are colorless. When relatively high $CeO_2$ contents are utilized there is a slight decrease in absorption in the blue range of the spectrum. Little is presently known of the mechanism which causes the ions of zinc and strontium to become effective only in very low concentrations and to result in an additional color reduction when used in combination with cerium. The use of zinc and strontium seems to influence the speed of recombination in irradiation-induced absorption centers, but only when present up to a low concentration limit in accordance with the present invention.

Without further elaboration, it is believed that one skilled in the art can, using the preceding description, utilize the present invention to the fullest extent. The following preferred specific embodiment is, therefore, to be construed as merely illustrative and not limitative of the remainder of the disclosure in any way whatsoever.

The presently preferred embodiments of the optical glass of the present invention are made according to methods which are conventional for the production of optical crown glass.

$SiO_2$: 68–75 percent
$Al_2O_3$: 4.5–8 percent
$B_2O_3$: 0–4 percent
$Na_2O$: 16–22 percent
$CeO_2$: 0.5–2.8 percent
$ZnO$: 0.05–0.8 percent
$SrO$: 0.05–0.8 percent From the foregoing description and example, one skilled in the art to which this invention pertains can easily ascertain the essential characteristics thereof and, without departing from the spirit and scope of the present invention, can make various changes and modifications to adapt it to various usages and conditions.

INDUSTRIAL APPLICABILITY

As a result of optimized properties, the glasses of the present invention have universal applicability, e.g. for ophthalmological purposes (UV-abosrbing glasses), optical elements of all types (lenses and prisms), optical elements which are exposed to strong irradiation satisfying specific requirements with respect to solarization resistance, glasses for utilization in nuclear technology (such as irradiation-resistant optics for microscopes and telescopes as well as glasses for filters and other irradiation-resistant, transparent accessories) and accessories for the construction of hot cells (such as discharge-free glass blocks, highly irradiation-resistant windows).

What is claimed is:

1. Optical glasses having optical values of $n_d$ about 1.51 and $v_d$ about 58, a density of about 2.46g/cm$^3$ and being characterized by good light transmission, low susceptibility to crystallization, good chemical stability (class 1 climate change stability, class 2 acid stability, class 0 spot value), very minor formation of color centers during irradiation, electrical conductivity of about $10^{-10} \times cm^{-1}$, a thermal expansion coefficient at $-30$ to $+70°$ C. of about $88 \times 10^{-7°}$ C. and good workability, said glasses being substantially free of alkaline earth metal oxides and consisting essentially of the following composition, in percent by weight:

$SiO_2$: 68–75 percent
$Al_2O_3$: 4.5–8 percent
$B_2O_3$: 0–4 percent
$Na_2O$: 16–22 percent
$CeO_2$: 0.5–2.8 percent
$ZnO$: 0.05–0.8 percent
$SrO$: 0.05–0.8 percent

* * * * *